(No Model.) 2 Sheets—Sheet 2.
J. B. NOYES.
MACHINE FOR MAKING AND DRIVING WIRE NAILS.
No. 545,523. Patented Sept. 3, 1895.
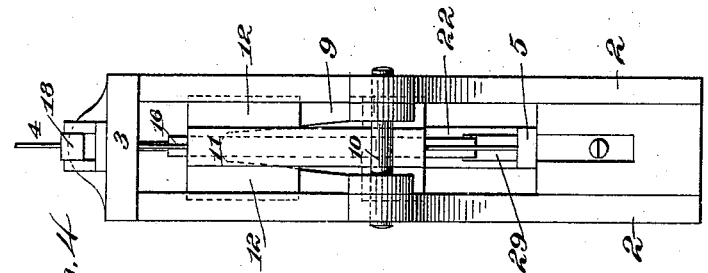
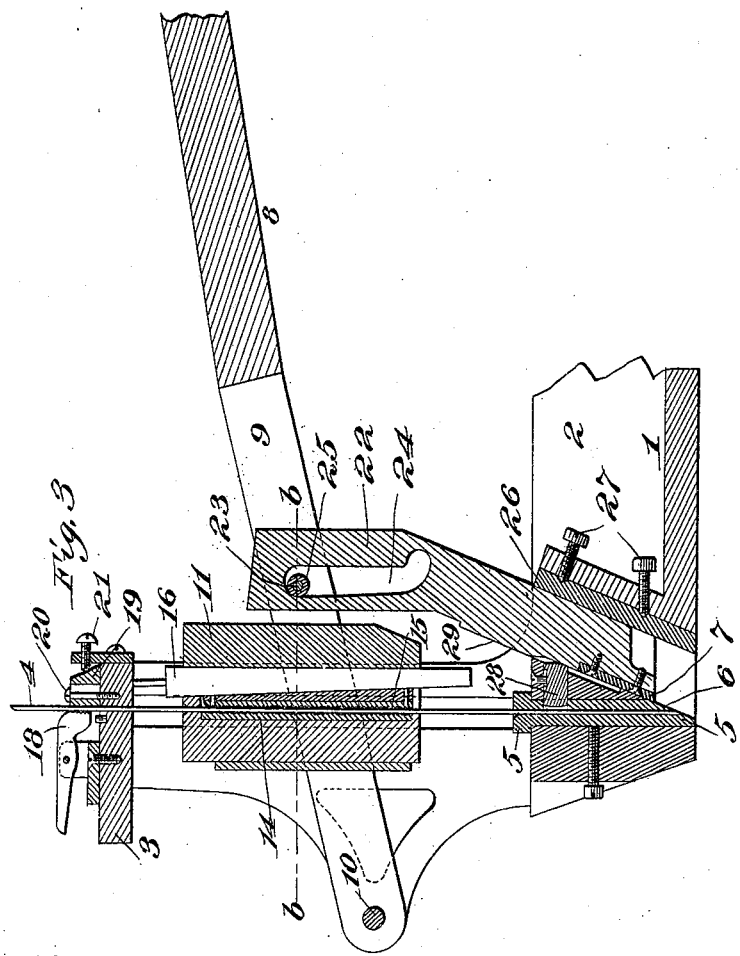
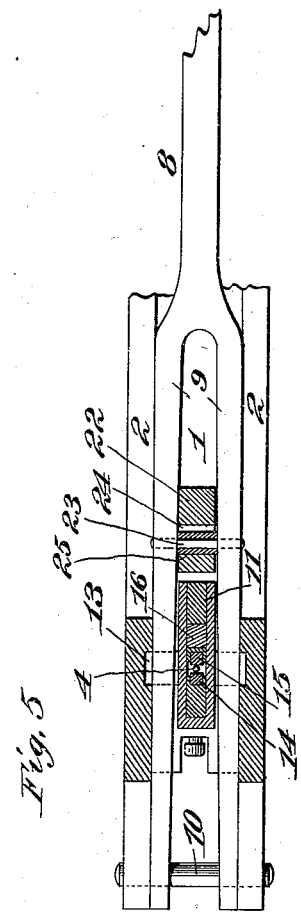
Witnesses:
Inventor
John B. Noyes
By J. H. Watson, Att'y.

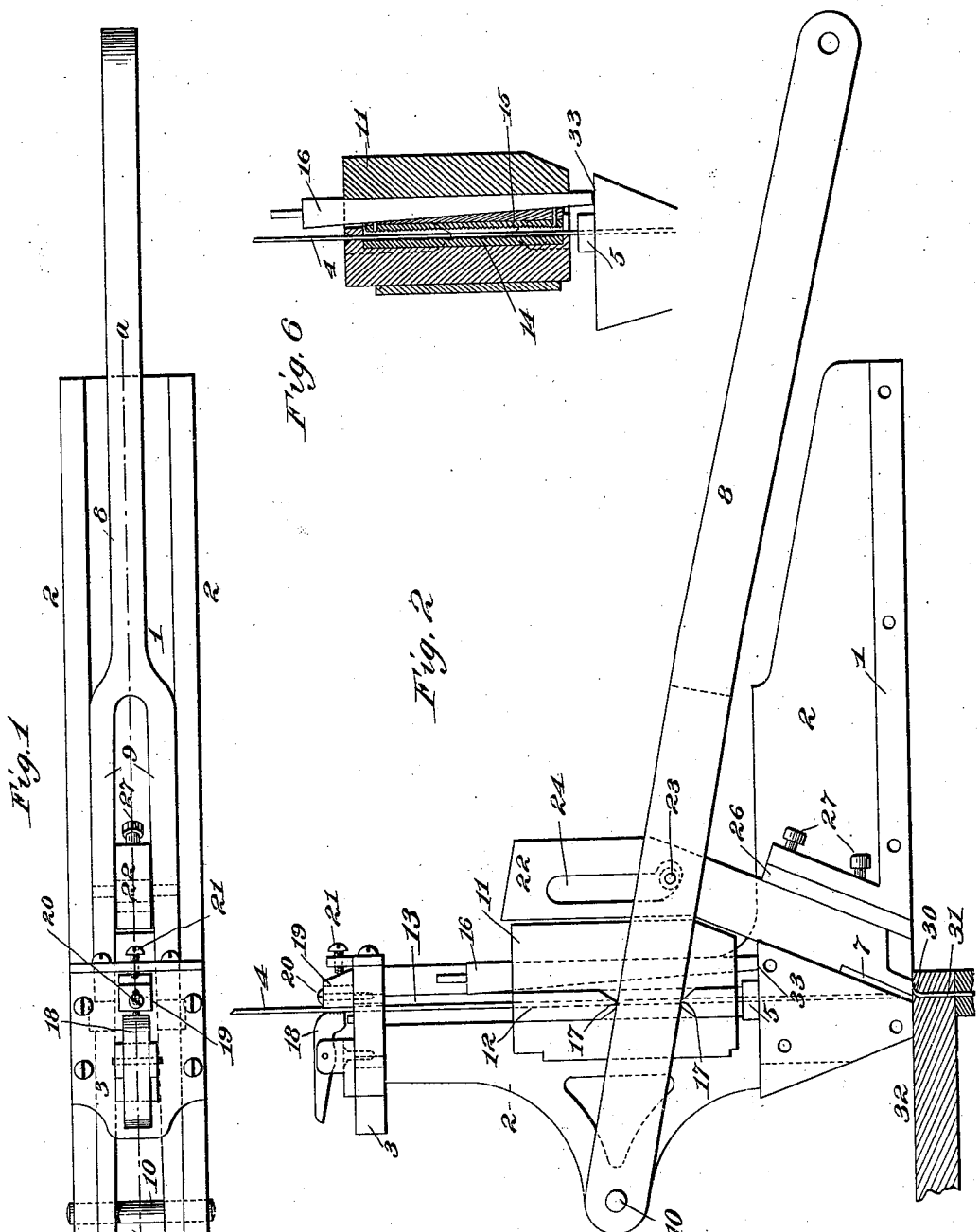

UNITED STATES PATENT OFFICE.

JOHN B. NOYES, OF BALTIMORE, MARYLAND, ASSIGNOR TO WALTER H. HARRISON, OF SAME PLACE.

MACHINE FOR MAKING AND DRIVING WIRE NAILS.

SPECIFICATION forming part of Letters Patent No. 545,523, dated September 3, 1895.

Application filed December 26, 1894. Serial No. 533,009. (No model.)

*To all whom it may concern:*

Be it known that I, JOHN B. NOYES, a citizen of the United States, residing at Baltimore, in the State of Maryland, have invented certain new and useful Improvements in Machines for Making and Driving Wire Nails, of which the following is a specification.

My invention relates to improvements in machines for making and driving wire nails.

The machine hereinafter described consists, mainly, of a feeding device which feeds a continuous wire to the point at which it is desired to drive the nails and devices for severing sections from the wire, pointing and heading them, and driving them into the parts of boxes or other articles to be joined.

I shall now proceed to describe the invention in detail, reference being had to the accompanying drawings, in which—

Figure 1 is a plan view of a machine embodying my invention. Fig. 2 is a side elevation of the same, one of the side plates of the frame being removed to show the internal construction and the cutter being depressed. Fig. 3 is an elevation, parts being shown in section on the line *a a* of Fig. 1 and showing the cutter elevated. Fig. 4 is a front elevation. Fig. 5 is a plan view, parts being in section on the line *b b* of Fig. 3; and Fig. 6 is a section of the feeding device similar to that shown in Fig. 3, but with the clamp open and freed from the wire.

The various working parts of the machine are mounted in a frame, consisting of a base plate 1, which may be attached to a bench or other suitable support, side plates or standards 2, and a top plate 3. The material from which the nails are made consists of a continuous wire 4, which may be supplied from a reel or other suitable holder. This wire enters a perforation in the top plate 3, passes down through a feeding device, which will be hereinafter described, and then through a perforation in a die-piece 5, which has an inclined lower face, in contact with which the cutter 7 works.

The moving parts of the machine are operated by a lever 8, which is bifurcated at its forward ends, the prongs 9 being pivoted at 10 to the sides of the main frame. Within the fork of the lever is a block or carriage 11, which has ribs 12, adapted to engage and slide in vertical grooves 13 in the inner sides of the side plates 2. In the feed-carriage is a fixed clamping-plate 14, preferably roughened or provided with teeth to engage the wire, and a movable wedge-shaped clamping-plate 15, provided with a similar clamping-surface. As shown, the clamping-plate 15 is tapered toward its upper end, and the space between the back of said plate and the wall of the carriage 11 is occupied by a reversely-tapered key 16. The carriage is mounted and guided so that the wire will pass in a straight line from the perforation in the upper plate 3 between the clamping-plates 14 15 to the perforation in the die-piece 5. The ribs 12 are cut away to receive the prongs 9 of the operating-lever, and the adjacent ends of the ribs are tapered into points 17, against which the upper and lower edges of the lever bear. It will be obvious that as the lever is raised and lowered the feeding-carriage 11 will be moved up and down in a positive manner. The wire is prevented from being moved upward accidentally by means of a toothed retaining-pawl 18, pivotally mounted on the plate 3. To adapt the machine for different sizes of wire, an abutment-block 19 is adjustably mounted on the top plate 3 opposite the pawl 18, the wire being fed in between them. This block is held to the plate 3 by means of a screw 20, which passes through a slot in the block. A second screw 21 in the rear of the block serves to adjust it and hold it up to the wire.

The cutter 7 has a shank 22, which extends up through the crotch of the lever and the cutter is operated by means of a transverse pin 23, mounted in the prongs of the lever and extending through a slot 24 in the cutter-shank. The pin 23 is preferably provided with an antifriction-roller 25, and the slot 24 is wide enough so that the roller may be moved from end to end thereof without disturbing the cutter. The cutter proper is inclined to the direction of the wire, so that it will sever the latter by an inclined cut. As shown, the cutting is done by a hardened steel blade forming the lower edge of the cutter. In the rear of the cutter I have shown a filling-block 26 and set-screws 27, by means of which the cutter may be accurately adjusted to the die-piece 5.

In order to hold the wire securely while the cut is being made, I provide a movable clamping-piece 28, as shown in Fig. 3. The forward end of this piece is adjacent to the wire and the rear end adjacent to the shank of the cutter. Upon the forward side of said shank is a cam projection 29, the lower end of which is curved or rounded. When the cutter is raised, as shown in Fig. 3, the lower end of this cam is above the clamping-piece 28; but after the wire is fed down the required amount the cam projection 29 takes effect on the clamp 28, and the latter grips the wire firmly while the cutting is being done, holding it until the cutter is again raised. The lower end of the cutter is horizontal, and it serves to complete the driving of the nail and turn down the bevel portion to form a head 30, as shown in Fig. 2, in which figure the nail 31 is shown as driven into two sections of a box 32. The lever 8 may be operated by hand; but I prefer to connect it with a suitable treadle or foot-piece so that power may be applied by the foot of the operator, both hands being free to hold the work to the machine. When operated by foot-power a spring or weight should be connected as usual to raise the lever.

The operation of the machine is as follows: The wire is passed in through the top plate, down through the feeding device, and out through the lower beveled or inclined face of the die-piece, as shown in the drawings. The handle is then depressed and the lower end of the wire sharpened by being severed on an incline. The box or other article to be nailed is then placed in position under the die-piece, as shown in Fig. 2. As the handle approaches the lowest position, the lower projecting end of the key 16 strikes a suitable abutment 33 and the key is raised, thus permitting the clamps 14 15 to separate and release the wire. The key 16 is held in position by a frictional contact with the carriage 11 while the latter is raised by the lever, and thus the carriage moves upward without drawing up the wire. During most of this upward movement the wire is held stationary by the clamp 28, and it is furthermore prevented from rising by the holding-pawl 18. As the carriage approaches the upper end of its travel, the key 16 comes in contact with the top plate 3 or other suitable abutment and is driven into the carriage, thus again clamping the wire between the plates 14 15. The wire is thus held firmly during the succeeding downward stroke of the lever, and during this stroke it is carried down and its lower end partially driven into the wood. As the lever approaches the lower end of its stroke, the key 16 again strikes the abutment 33 and the wire is released from the clamps. About the same time the pin 23 engages the lower end of the slot 24 and forces the cutter down, the effects being, first, to clamp the wire by means of the block 28, then to sever the wire by an inclined cut, and, lastly, to form a head, as shown in Fig. 2.

It will be evident that changes in construction and arrangement of the herein-described machine may be made without departing from the spirit of the invention herein mentioned.

Therefore, without limiting myself to the precise construction and arrangement of parts illustrated and described, I claim—

1. The combination, in a machine of the class described, with a die-piece having an inclined face through which the wire passes, of a cutter arranged to co-operate with the die-piece to sever the wire, a clamp for holding the wire while it is being cut, and a cam projection upon the cutter shank for operating the clamp, substantially as described.

2. The combination, in a machine of the class described, with a die-piece having an inclined face through which the wire passes, and a cutter adapted to co-operate therewith to sever the wire into sections, of a clamp for holding the wire, a cam projection on the cutter shank for operating the clamp, and means for feeding successive portions of the wire to the cutter, said clamp and feeding devices being arranged to operate alternately, whereby the wire is free to move while being fed and clamped while being cut, substantially as described.

3. The combination, in a machine of the class described, with a die through which the wire passes, a cutter co-operating with the die and arranged to sever the wire by an inclined cut, said cutter having a shank provided with an elongated slot, a pin arranged to travel in the slot and to move the cutter by engagement alternately with the ends of the slot, said pin being carried by a lever or equivalent operating device, substantially as described.

4. In a machine of the class described, the feeding device consisting of the carriage longitudinally movable in guides, a movable clamping piece mounted in the carriage, a tapered key also mounted in the carriage, and suitable abutments on the main frame arranged to alternately tighten and loosen the key as the carriage is reciprocated, substantially as described.

5. In a machine of the class described, the combination with the main frame, of a lever pivoted to said frame, a feeding carriage movable in the direction of the wire and suitably guided by the frame, said carriage being in engagement with the lever, fixed and movable clamping plates mounted in the carriage, a tapered key-piece in engagement with the movable clamping plate and suitable abutments on the main frame for driving and releasing said key-piece, substantially as described.

6. In a machine of the class described, the feeding carriage reciprocating in guides, said carriage being provided with a fixed clamping plate, a tapered movable clamping plate and a reversely tapered key, means for reciprocating the carriage and suitable abutments for engaging the key to drive and release the same as the carriage is reciprocated, substantially as described.

7. The combination, with the die-piece and cutter and the reciprocating feeding device, of the pivoted retaining pawl arranged to prevent backward movement of the wire and the adjustable block opposite said pawl and arranged to co-operate therewith, substantially as described.

In testimony whereof I affix my signature in presence of two witnesses.

JOHN B. NOYES.

Witnesses:
 JNO. WATSON, Jr.,
 CHAS. L. HUTCHINS.